United States Patent
Anderson

(10) Patent No.: US 7,793,506 B2
(45) Date of Patent: Sep. 14, 2010

(54) EMISSION CONTROLLED ENGINE EXHAUST STATIC TEST STAND

(75) Inventor: Douglas G. Anderson, Chino Hills, CA (US)

(73) Assignee: Wyle Laboratories, Inc., El Segundo, CA (US)

( * ) Notice: Subject to any disclaimer, the term of this patent is extended or adjusted under 35 U.S.C. 154(b) by 659 days.

(21) Appl. No.: 11/503,059

(22) Filed: Aug. 11, 2006

(65) Prior Publication Data

US 2008/0034851 A1  Feb. 14, 2008

(51) Int. Cl.
*F02C 1/00* (2006.01)
(52) U.S. Cl. ........................................................ 60/772
(58) Field of Classification Search ................. 422/168; 73/23.31, 116; 96/361, 363; 60/264
See application file for complete search history.

(56) References Cited

U.S. PATENT DOCUMENTS

| | | | |
|---|---|---|---|
| 3,684,054 A * | 8/1972 | Lemmerman | 181/203 |
| 3,768,258 A | 10/1973 | Smith et al. | |
| 3,839,846 A | 10/1974 | Teller | |
| 3,899,923 A | 8/1975 | Teller | |
| 4,055,044 A | 10/1977 | Dederra et al. | |
| 5,874,057 A | 2/1999 | Deeba et al. | |
| 6,105,365 A | 8/2000 | Deeba et al. | |
| 6,237,395 B1 * | 5/2001 | Helgeson | 73/23.31 |
| 6,311,484 B1 | 11/2001 | Roth et al. | |
| 6,497,137 B2 | 12/2002 | Helgeson | |
| 6,514,470 B1 | 2/2003 | Ott et al. | |
| 6,779,335 B2 | 8/2004 | Herdy, Jr. | |
| 6,843,054 B2 | 1/2005 | Taylor, III et al. | |
| 2004/0216535 A1 | 11/2004 | Brostmeyer et al. | |
| 2005/0060982 A1 | 3/2005 | Mani et al. | |

* cited by examiner

*Primary Examiner*—Tom Duong
(74) *Attorney, Agent, or Firm*—Freilich, Hornbaker & Rosen

(57) ABSTRACT

A method and apparatus for reducing the emission of pollutants resulting from static test firings of rocket and jet engines. The apparatus comprises a test stand for capturing the exhaust gas from an engine undergoing a static test. The test stand includes a duct system for guiding the exhaust gas from a duct inlet to a duct outlet through stages that reduce the exhaust gas pollutants. Liquid oxygen ("LOX") is introduced into the duct system to interact with the engine exhaust gas stream. By introducing LOX, the pollutant CO is converted to non-pollutant carbon dioxide ("$CO_2$") as the exhaust stream moves through the duct system.

7 Claims, 6 Drawing Sheets

US 7,793,506 B2

EMISSION CONTROLLED ENGINE EXHAUST STATIC TEST STAND

FIELD OF THE INVENTION

This invention relates generally to the static testing of rocket and jet engines and more particularly to a method and apparatus for treating engine exhaust gas to reduce pollutants discharged to the atmosphere.

BACKGROUND OF THE INVENTION

Rocket and jet engines use the combustion of propellant chemicals to propel vehicles and missiles into or through Earth's atmosphere. To assure the proper functioning of such engines, extensive tests and static firings of engines are performed at ground based test facilities. During such static test firings, hydrocarbon fueled engines typically emit a high mass fraction of the pollutant carbon monoxide ("CO") into the atmosphere where further reactions can form pollutant oxides of nitrogen ("NOx"). Also, particulate matter may be discharged as a result of incomplete combustion and the levels of such pollutants emitted into the atmosphere may be unacceptable. Additionally, depending upon the size of the engine, the testing may produce unacceptably high noise levels.

SUMMARY OF THE INVENTION

The present invention is directed to a method and apparatus for treating engine exhaust to reduce the emission of chemical pollutants resulting from static test firings of rocket and jet engines.

In accordance with the present invention, a test stand is provided for capturing the exhaust gas from an engine undergoing a static test. The test stand is characterized by a duct system which guides the exhaust gas from a duct inlet to a duct outlet through stages that reduce the exhaust gas pollutants.

In accordance with one significant aspect of the invention, an oxidizer, e.g., liquid oxygen ("LOX"), is introduced into the duct system to interact with the engine exhaust gas stream. By properly introducing the oxidizer, the pollutant CO is converted to a non-pollutant carbon dioxide ("$CO_2$") as the exhaust stream moves through the duct system. In accordance with a further significant aspect, a coolant, e.g., water, is also introduced into the exhaust stream to reduce the exhaust gas temperature to avoid the formation of pollutant oxides of nitrogen NOx.

In accordance with a further feature of a preferred embodiment, the amount of free air entrained by the exhaust gas entering the duct system is minimized in order to further reduce the formation of NOx.

In a preferred embodiment of the invention, the engine exhaust gas entering the duct inlet will first flow through a diffuser duct section designed to reduce the velocity of the exhaust gas stream and then through a CO converter duct section. With the exhaust gas stream above a threshold temperature, an oxidizer, preferably LOX, is injected into the stream within the CO converter duct section where it combines with the CO in the exhaust gas to form $CO_2$. Coolant is also injected into the exhaust stream in the CO converter duct section to reduce the temperature of the stream below the threshold temperature that promotes the formation of NOx in free (i.e. atmospheric) air, and to assist in converting CO into $CO_2$.

DETAILED DESCRIPTION

Figure 1:
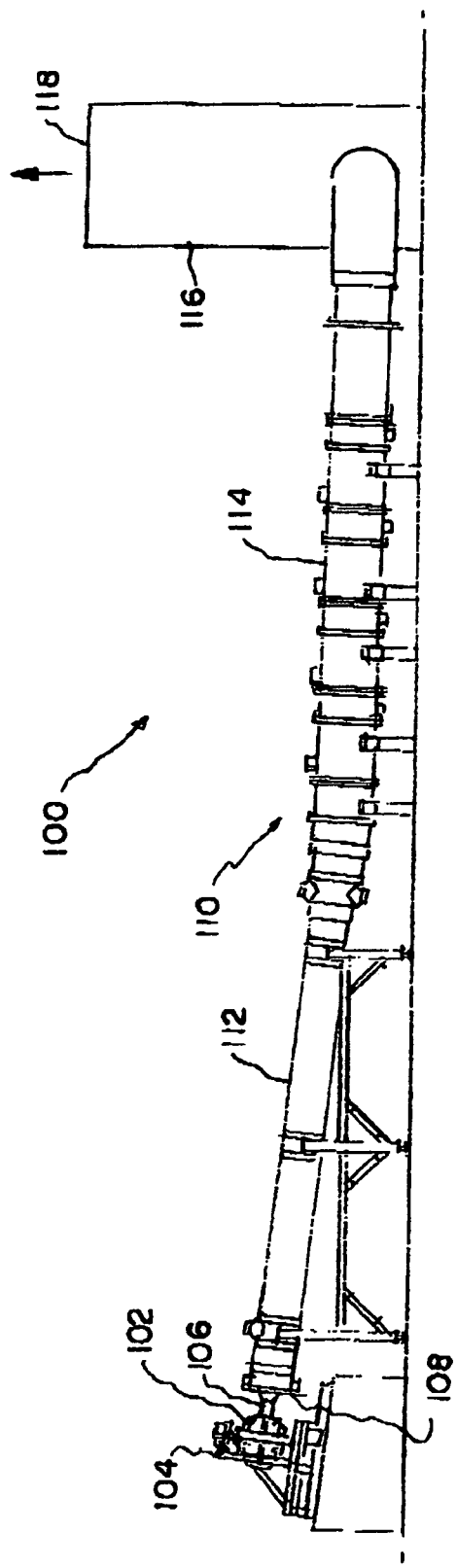
FIG. 1 is a side view of an exemplary test stand comprising a duct system including a diffuser section, a CO converter section, and an exhaust stack.

FIG. 1 is a side view of a representative test stand 100 in accordance with the invention showing an exemplary rocket or jet engine 102 under test, restrained by an engine thrust mount 104. The engine's exhaust nozzle 106 is mounted to discharge engine exhaust into the inlet 108 of a duct system 110 formed primarily of flanged pipe sections, or spools, coupled in series. The duct system 110 can be viewed as comprising the following major functional units; a diffuser section 112, a CO converter section 114, and an exhaust stack section 116 leading to an outlet 118 to the atmosphere.

Figure 2:
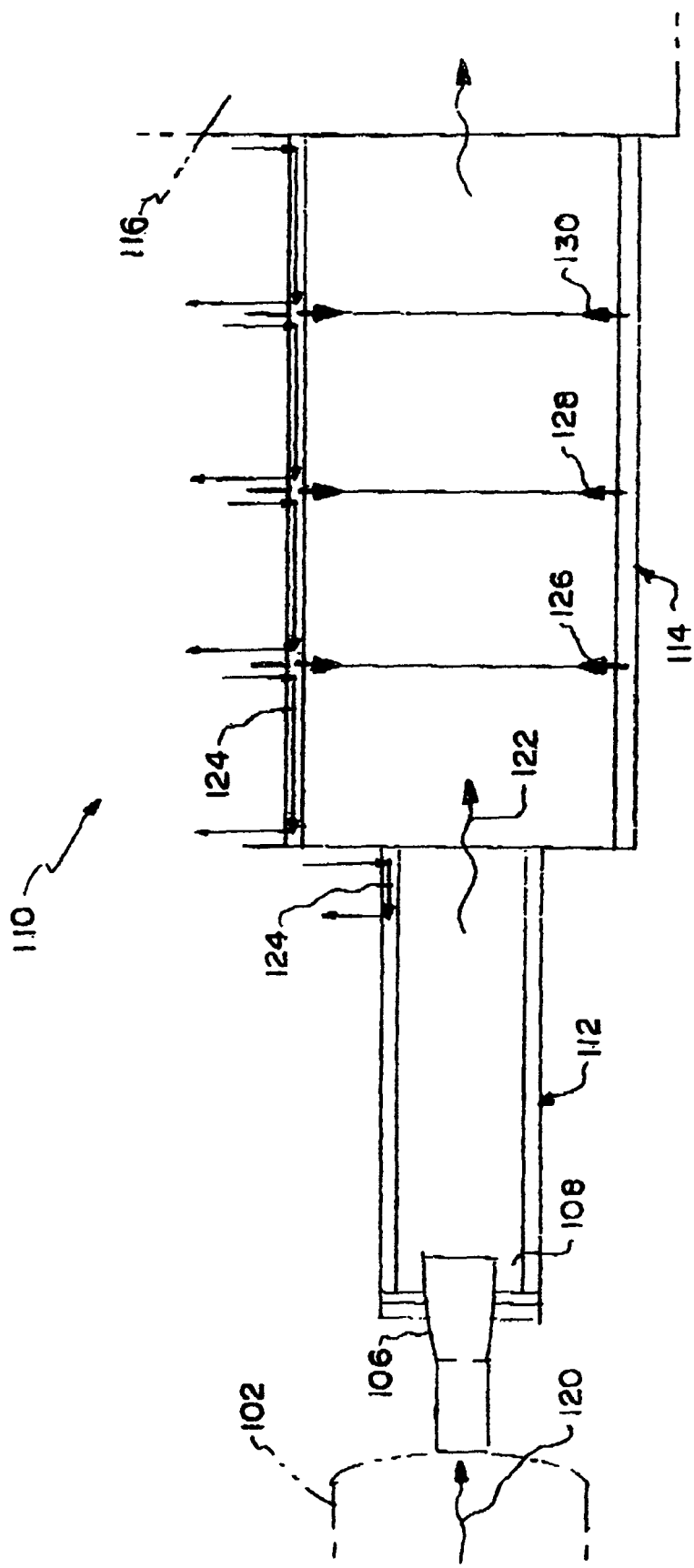
FIG. 2 is a schematic representation of the diffuser and CO converter sections of FIG. 1 in accordance with the present invention.

FIG. 2 schematically represents the duct system 110 of the test stand 100 of FIG. 1 and shows the exemplary engine 102 mounted with its nozzle 106 adjacent to duct inlet 108. Typically, propellant 120 fed into the engine 102 is ignited and burns in the combustion chamber (not shown) to produce thrust. The process of igniting and burning the propellant 120 in the engine 102 releases energy in the form of heat and pressure. The products of combustion then expand and exit with a high velocity from the nozzle 106 to produce thrust. But for the engine being restrained by the thrust mount 104 (see FIG. 1), the thrust produced would propel the engine 102 in a direction opposite to the exhaust discharged from the nozzle 106. During static test in the test stand 100, the exhaust stream discharge from the nozzle 106 passes through the duct system inlet 108 and enters the diffuser section 112.

The primary function of the diffuser section 112 is to reduce the velocity of the entering exhaust stream 122 to below the speed of sound, Mach 1, at the diffuser section exit. Once the flow has become subsonic, the static pressure will increase sufficiently to drive the exhaust gas through the downstream converter and stack sections to the atmosphere. The temperature of the exhaust gas exiting the nozzle 106 is extremely high (typically in excess of 4000° F.) and the heat transfer from the gas to the wall of the diffuser section 112 is extremely high. To survive the extreme thermal load, it is preferable that the diffuser section 112 include a actively cooled water jackets 124.

The exhaust stream 122 exiting the diffuser section 112 enters the CO converter section 114. A primary function of the CO converter section 114 is to reduce the CO content of the exhaust stream 122 by converting CO to $CO_2$. This is accomplished in accordance with the invention by introducing coolant 126, e.g., deionized water, into the exhaust stream near the upstream end of the converter section 114 to cool the exhaust stream to a temperature in excess of ~3000° F. Above this temperature, the introduction of oxidizer at 128 combines with CO in the exhaust stream to form $CO_2$. The preferred oxidizer is liquid oxygen (LOX) because it constitutes a pure and dense form of oxygen. However, alternative oxidizers, e.g., hydrogen peroxide ($H_2O_2$), can be used. Regardless, the process is exothermic. Accordingly, the CO converter section 114 introduces further coolant downstream at 130 to reduce the exhaust stream temperature to below a threshold temperature (~2,780° F.) at which NOx is formed in free air. In the preferred embodiment described herein, the coolant 126 will be assumed to be deionized water and the oxidizer will be assumed to be LOX.

The converter section 114 is typically constructed of multiple flanged pipe, or spool, sections preferably including actively cooled water jackets 124. The introduction of water and LOX into the exhaust stream flowing through converter section 114 is preferably implemented via injection rings to be discussed in greater detail in conjunction with FIG. 5.

In an exemplary embodiment, the converter section 114 will typically reduce the exhaust stream temperature to ~2000° F. at the exit of the converter section, i.e., at the entrance to the stack section 116.

The primary purpose of the stack section 116 is to further cool and maintain the exhaust stream below the threshold temperature required to form NOx. The stack section 116 is preferably vertically oriented with a cross section dimension considerably larger than the cross section dimension of converter section 114 for the purpose of slowing the exhaust stream velocity to below Mach 0.25. At this low velocity, the exhaust stack will be a phase separator for excess liquid water, any unburned fuels and any soot or particulate. These will be collected at the base of the vertical exhaust stack. All chemical reactions within the exhaust gases will be quenched by water sprays contained near the upper portion of the exhaust stack assembly. The design exit temperature of the exhaust gases into the atmosphere is ~900° F.

The length and diameter of the diffuser section 112 are selected in relation to the thrust rating of the engine 102 under test; and should be sized to reduce the velocity of the exhaust stream 118 to below Mach 1 at the diffuser section exit. To achieve this result, the ratio of diffuser section length to diameter is typically greater than twelve.

The length and diameter of the CO converter section 114 are selected with regard to the diffuser section dimensions. Typically, the CO converter section 114 will have a diameter of about twice that of the diffuser section and a length at least six times the diameter of the converter section 114.

Figure 3:
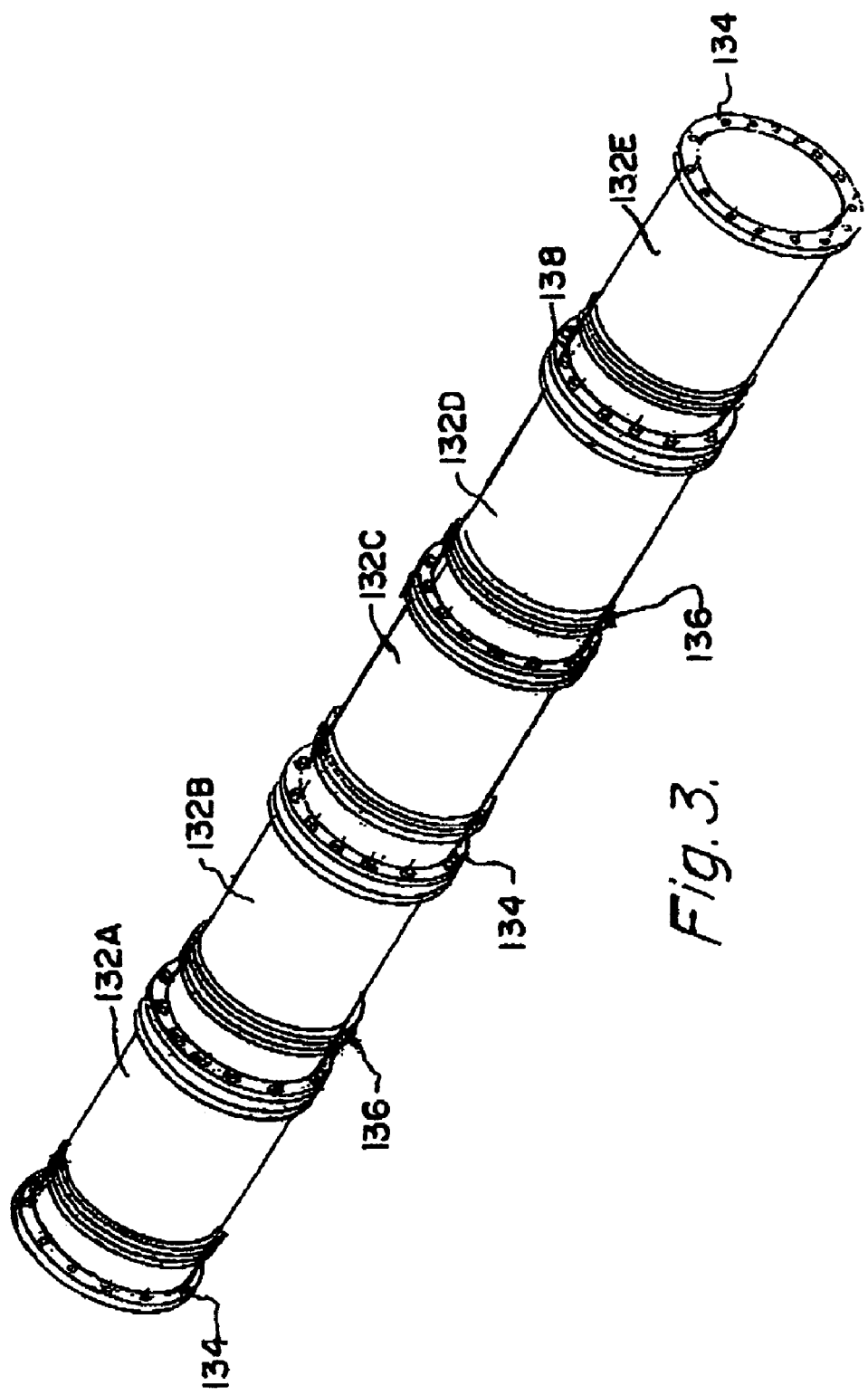
FIG. 3 is an isometric view of a portion of the duct system of FIG. 1.

Whereas FIG. 2 schematically depicts a duct system 110 in accordance with the present invention, FIGS. 3-6 illustrate a preferred structural embodiment of such a duct system. More particularly, FIG. 3 shows multiple identical pipe sections, i.e. spools, 132A, 132B, 132C, 132D, and 132E. Each spool has a flange 134 on each end. The flanges are bolted together to complete the spools in series to form the converter section 114 to define a continuous interior passageway for guiding the exhaust stream. Although FIG. 3 depicts a representative converter section 114, it should be understood that the diffuser section 112 would have a very similar appearance but, as previously mentioned would differ significantly dimensionally.

It should be noted in FIG. 3 that each spool section 132 includes a bellows-like section 136 to accommodate the differential longitudinal expansion/contraction of the spool section 132 outer wall relative to the inner wall (as will be discussed in conjunction with FIG. 4) attributable to thermal effects. It should also be noted in FIG. 3 that fluid injection rings 138 are mounted between adjacent flanges. As will be discussed in greater detail hereafter, the rings 138 function to inject fluid (e.g., LOX, water) into the exhaust stream.

Figure 4:
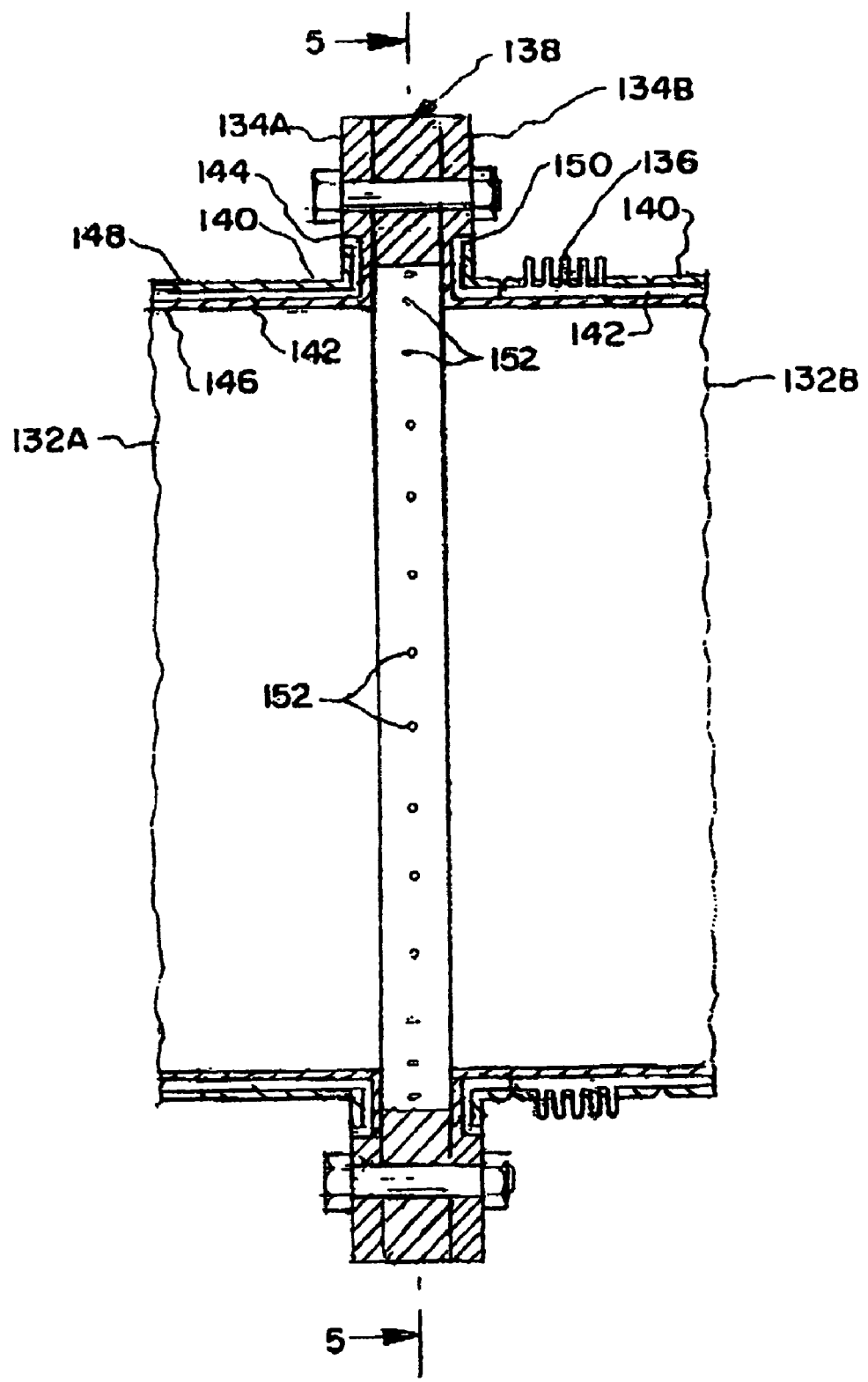
FIG. 4 is an enlarged cross section view showing the junction of preferred spool sections in the duct system of FIG. 1.

FIG. 4 depicts a typical junction between flanges 134A and 134B of adjacent spools 132A and 132B. Initially note that each spool section 132 includes a double walled cooling manifold 140, with cooling water 142 flowing in 144 between the inner wall 146 and the outer wall 148, at the downstream flange end of each spool 132, through the cooling manifold 140, and out 150 at the upstream flange end of each spool 132. The outer wall 148 of each spool section 132 includes the bellows-like section 136 to allow for the differing rate of thermal expansion of the duct outer wall 148 compared to the thermal expansion of the duct inner wall 146. Note also in FIG. 4, the fluid injection ring 138 mounted between the flanges 134 of adjacent spools 132A,132B.

Figure 5:
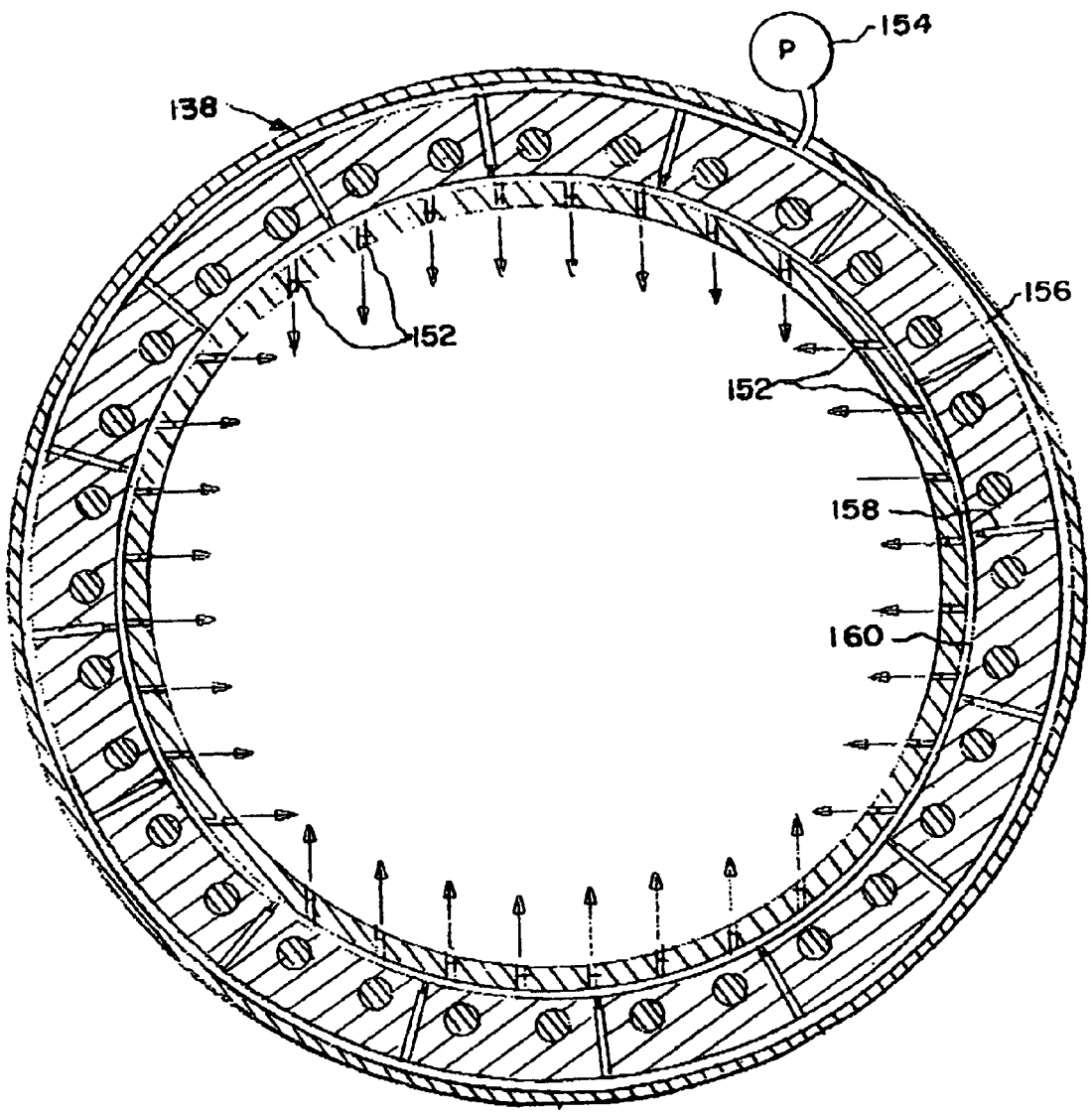
FIG. 5 is a cross section view of the preferred injection ring shown in FIG. 4 indicating the radial and cordial injection pattern.

FIG. 5 is a cross section view of an exemplary fluid injection ring 138 for use in the CO converter section 114 (see FIGS. 3 and 4). Either water or LOX can be injected through injection jets 152 into the exhaust stream 118. It will be recalled that water is injected in order to cool the exhaust stream 118. LOX is injected to combine with CO in the exhaust stream to produce $CO_2$. In the exemplary injection ring 138 shown in FIG. 5, fluid from a source 154 is supplied to an outer circumferential manifold 156. Radially oriented passages 158 couple manifold 156 to an inner circumferential manifold 160 which supplies fluid to the injection jets 152. In the preferred embodiment illustrated, the jets are organized into four quadrants with the jets of each quadrant oriented parallel to each other and perpendicular to the jets of each neighboring quadrant. In this manner, the jets will discharge into the exhaust stream both radially and cordially to optimize the cooling and conversion of CO to $CO_2$.

Figure 6:
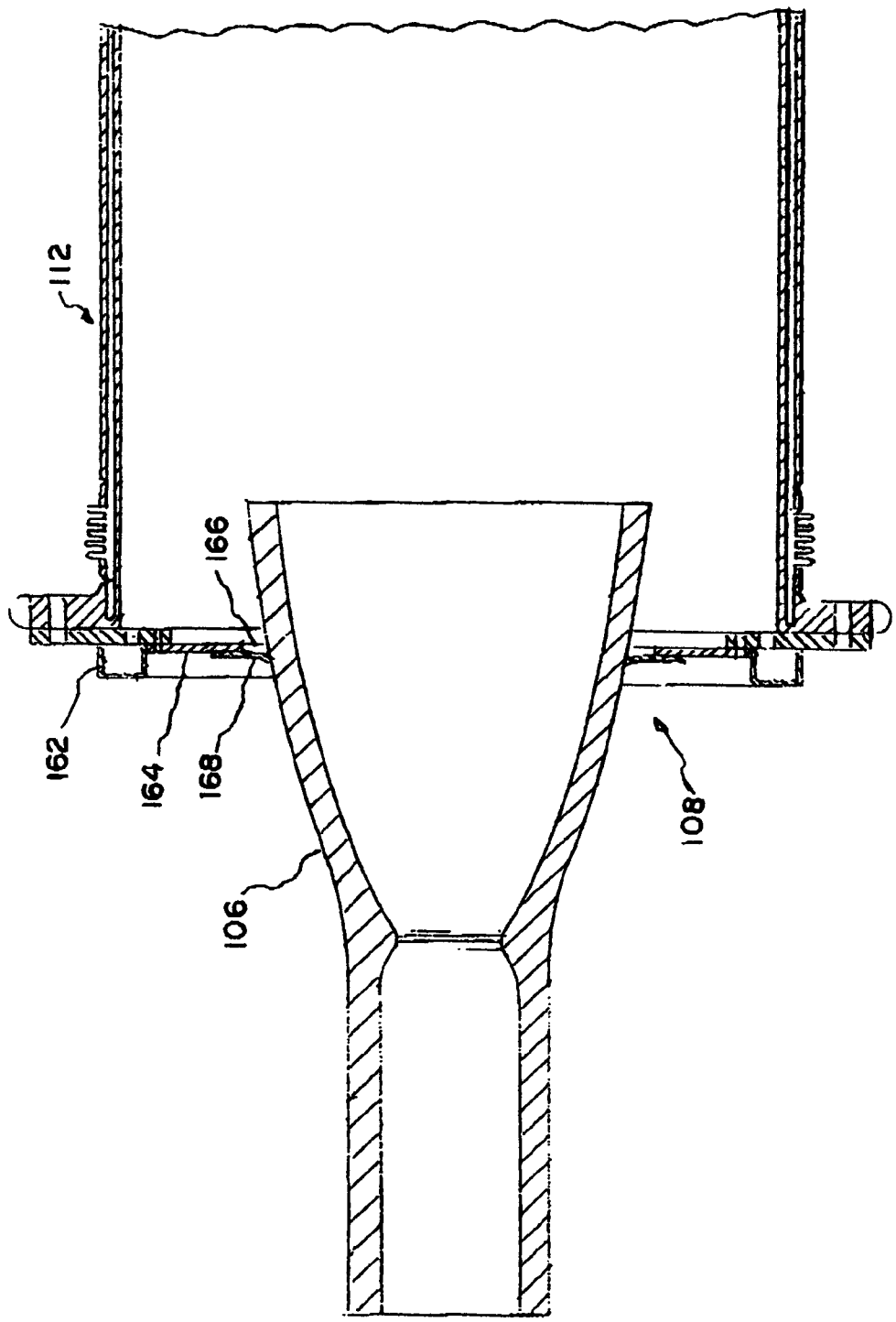
FIG. 6 is an enlarged cross section view showing a preferred interface between a nozzle of the engine under test and the inlet of the duct system of FIG. 1.

Attention is now directed to FIG. 6 which illustrates a preferred interface adapter 162 for coupling the engine nozzle 106 to the diffuser section duct inlet 108. The purpose of the adapter 162 is to minimize the amount of free air entrained by the exhaust gas entering the duct inlet 108, yet not physically constrain the engine under test so as to influence thrust measurements. By minimizing the amount of free air (typically 78% nitrogen [$N_2$]) entrained, the amount of pollutant NOx in the gas exhausted by the duct system 110 will be reduced.

The adapter 162 is comprised of a closure plate 164 configured to seal around the duct inlet 108. The plate 164 defines a large central opening 166, large enough to pass the engine nozzle 106 as shown in FIG. 6. The plate 164 carries a resilient seal, or flap, 168 extending around the opening 166 and configured to narrow the clearance gap between the nozzle exterior surface and the opening 166. For example, in exemplary embodiments of the invention, the flap 168 reduces the gap to approximately 0.1 inch to restrict the amount of free air (and $N_2$) which can be drawn into the diffuser section 112.

From the foregoing, it should now be appreciated that a test stand has been described for capturing and treating exhaust gas from an engine undergoing a static test firing to minimize pollutants discharged to the atmosphere. The test stand embodiment described is characterized by a duct system extending between a duct system inlet which captures exhaust gas from the engine and a duct system outlet which discharges to the atmosphere and which system introduces a liquid coolant and an oxidizer into the exhaust stream for converting CO to $CO_2$ and for minimizing the formation of NOx.

Although a preferred embodiment has been described in detail herein, it is recognized that many variations and modifications will readily occur to persons skilled in the art which are consistent with the teachings of this application and within the intended scope of the appended claims.

The invention claimed is:

1. A system for treating exhaust gas discharged from an engine undergoing static testing so as to minimize pollutants discharged to the atmosphere, said system comprising:
   - an engine operable to discharge an exhaust gas stream from an engine exhaust nozzle;
   - an engine thrust mount for restraining movement of said engine;
   - a duct system having a duct inlet and a duct outlet for guiding an exhaust gas stream entering said duct inlet toward said duct outlet;
   - an adapter coupling said engine exhaust nozzle to said duct inlet, said adapter being physically configured to minimize the amount of free air entrained by said exhaust gas stream entering said duct inlet;
   - said duct system including an upstream diffuser section, an intermediate converter section, and a downstream exhaust section; wherein
   - said diffuser section is physically configured to reduce the velocity of said exhaust gas stream;
   - said converter section includes injector means for introducing an oxidizer and a coolant into said exhaust gas stream; and wherein
   - said exhaust section is physically configured to reduce the velocity and temperature of said exhaust gas stream exiting said converter section.

2. The system of claim 1 wherein said adapter includes a resilient seal extending around said engine exhaust nozzle to minimize the entry of free air into aid duct inlet.

3. The system of claim 1 wherein said injector means comprises at least one injector ring mounted to pass said exhaust gas stream therethrough; and
   - a plurality of injection nozzles carried by said injector ring oriented to inject said coolant and said oxidizer both radially and chordially into said exhaust stream.

4. The system of claim 1 wherein said engine exhaust gas stream contains carbon monoxide; and wherein
   - said oxidizer introduced into said exhaust gas stream converts said carbon monoxide to carbon dioxide.

5. The system of claim 1 wherein said engine exhaust gas stream contains nitrogen; and wherein
   - said coolant introduced into said exhaust gas stream prevents the formation of oxides of nitrogen.

6. The system of claim 1 wherein said exhaust section further includes means for trapping particulate matter.

7. The system of claim 1, wherein said diffuser and converter sections include an inner peripheral wall and an outer peripheral wall spaced therefrom to define a cooling manifold.

* * * * *